United States Patent
Lin et al.

(10) Patent No.: US 10,498,237 B1
(45) Date of Patent: Dec. 3, 2019

(54) MULTI-PHASE DC-DC POWER CONVERTER AND DRIVING METHOD OF THE SAME

(71) Applicant: ANPEC ELECTRONICS CORPORATION, Hsinchu (TW)

(72) Inventors: Hsin-Tai Lin, Taichung (TW); Tzu-Yang Yen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/411,325

(22) Filed: May 14, 2019

(30) Foreign Application Priority Data

Feb. 25, 2019 (TW) .............................. 108106257 A (51) Int. Cl.
  *H02M 3/158* (2006.01)
  *H02M 1/00* (2006.01)

(52) U.S. Cl.
  CPC .......... *H02M 3/158* (2013.01); *H02M 3/1584* (2013.01); *H02M 2001/007* (2013.01); *H02M 2001/0074* (2013.01); *H02M 2001/0077* (2013.01); *H02M 2003/1586* (2013.01)

(58) Field of Classification Search
  CPC ... H02M 2001/007; H02M 2001/0074; H02M 2001/0077; H02M 3/1584; H02M 2003/1586
  USPC ................ 323/242, 243, 246, 272, 284, 288
  See application file for complete search history.

(56) References Cited

U.S. PATENT DOCUMENTS

| | | | | |
|---|---|---|---|---|
| 2010/0320983 A1* | 12/2010 | Wu | ........................ | H02M 3/156 323/283 |
| 2013/0293203 A1* | 11/2013 | Chen | ..................... | H02M 1/084 323/234 |
| 2015/0061625 A1* | 3/2015 | Chen | ..................... | H02M 3/158 323/282 |
| 2018/0013348 A1* | 1/2018 | Paul | .................... | H02M 3/1584 |

* cited by examiner

*Primary Examiner* — Gary A Nash
(74) *Attorney, Agent, or Firm* — Li & Cai Intellectual Property (USA) Office (57) ABSTRACT

A multi-phase DC-DC power converter includes an error amplifier, a comparator, a phase selection circuit, a plurality of phase circuits and a PFM/PWM logic control circuit. The plurality of phase circuits are each associated with a phase of the multi-phase DC-DC power converter, each including a turn-on clock generation circuit, a first switching transistor, a second switching transistor, an output inductor, a zero-crossing detection circuit, and a control logic. The PFM/PWM logic control circuit is configured to output, in response to a PFM control signal and a control signal associated with switch signals, a first PFM control signal and a second PFM control signal to a first phase circuit and a second phase circuit of the plurality of phase circuits. The PFM/PWM logic control circuit enters a first phase, a second phase, and a third phase under a light load condition or a no load condition.

9 Claims, 6 Drawing Sheets

MULTI-PHASE DC-DC POWER CONVERTER AND DRIVING METHOD OF THE SAME

CROSS-REFERENCE TO RELATED PATENT APPLICATION

This application claims the benefit of priority to Taiwan Patent Application No. 108106257, filed on Feb. 25, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a multi-phase DC-DC power converter, and more particularly to a multi-phase DC-DC power converter for improving the voltage drop generated when the PFM mode enters the PWM mode under light load or no load conditions.

BACKGROUND OF THE DISCLOSURE

The existing electronic systems employ multiple DC-to-DC converters to convert a main bus voltage from a power source supplying the system to one or more voltages required for driving integrated circuits in the electronic systems. Switching regulators, also referred to as DC to DC converters, are used to convert an input supply voltage to a desired output voltage at a voltage level appropriate for integrated circuits in an electronic system.

In most cases, a pulse width modulation (PWM) switching regulator is used to supply digital core circuitry. On the other hand, an I/O interface circuit remains turned on during a standby mode of operation. Thus, the I/O interface circuit requires a power supply capable of delivering high efficiency to a normal load as well as to a light load. In order to meet the requirements of the "green" regulations, a power supply for the I/O interface circuit needs to have high efficiency at the light load condition when the system is in the standby mode. In most cases, a pulse frequency modulation (PFM) switch regulator is desired for high efficiency light load operation.

Here, in a light load condition, when a circuit enters a PWM mode from a PFM mode, a zero-crossing detection circuit is generally turned off, and a lower-bridge circuit is turned on to enter the PWM mode. However, a voltage drop in the output voltage may occur, and a level of the voltage drop would be determined based on a loop response speed.

Therefore, in order to overcome the above-mentioned issues, improving the circuit design has become one of the important issues to be solved in this field so as to reduce the voltage drop generated under light load or no load conditions.

SUMMARY OF THE DISCLOSURE

In response to the above-referenced technical inadequacies, the present disclosure provides a multi-phase DC-DC power converter for improving the voltage drop generated at light load or no load conditions.

In one aspect, the present disclosure provides a multi-phase DC-DC power converter, which includes an error amplifier, a comparator, a phase selection circuit, a plurality of phase circuits and a PFM/PWM logic control circuit. The error amplifier is configured to receive a reference voltage and a feedback voltage from an output voltage node, and amplify a difference signal of the feedback voltage and the reference voltage to output an error signal. The comparator is configured to receive and compare the error signal and a sawtooth signal to generate a comparison output signal. The phase selection circuit is configured to separate the comparison output signal into a plurality of phase signals. The plurality of phase circuits are each associated with a phase of the multi-phase DC-DC power converter, each including a turn-on clock generation circuit, a first switching transistor, a second switching transistor, an output inductor, a zero-crossing detection circuit, and a control logic. The turn-on clock generation circuit is configured to generate a turn-on clock signal in response to one of the plurality of phase signals, and the first switching transistor responsive to a switching signal and is coupled between an input voltage node and a phase node. The second switching transistor responsive to another switching signal and is coupled between the phase node and a ground node. The output inductor is coupled between the output voltage node and the phase node. The zero-crossing detection circuit is configured to detect, in response to a PFM activation signal, whether a voltage of the phase node crosses a voltage zero point to generate a zero-crossing detection signal. The control logic is configured to generate, in response to the turn-on clock signal and the zero-crossing detection signal, the switching signals. The PFM/PWM logic control circuit is configured to output, in response to the PFM control signal and a control signal associated with switch signals, at least one first PFM control signal and at least one second PFM control signal to at least one first phase circuit and at least one second phase circuit of the plurality of phase circuits. The PFM/PWM logic control circuit enters a first phase, a second phase, and a third phase under a light load condition or a no load condition. In the first phase, the at least one first phase circuit operates in a PFM mode, and the at least one second phase circuit alternatively operates in the PFM mode and a PWM mode. In the second phase, the at least one first phase circuit operates in the PFM mode, and the at least one second phase circuit operates in the PWM mode. In the third phase, the at least one first phase circuit operates in the PWM mode, and the at least one second phase circuit operates in the PWM mode.

In one aspect, the present disclosure provides a driving method of a multi-phase DC-DC power converter, the method includes: configuring an error amplifier to receive a reference voltage and a feedback voltage from an output voltage node, and amplifying a difference signal of the feedback signal and the reference voltage to output an error signal; configuring a comparator to receive and compare the error signal and a sawtooth signal to generate a comparison output signal; configuring a phase selection circuit to separate the comparison output signal into a plurality of phase signals; configuring each of a plurality of phase circuits to be associated with one of phases of the multiphase DC-DC power converter. The plurality of phase circuits each includes: a turn-on clock generation circuit configured to generate a turn-on clock signal in response to one of the plurality of phase signals; a first switching transistor responsive to a switching signal and coupled between an input voltage node and a phase node; a second switching transistor responsive to another switching signal and coupled between the phase node and a ground node; an output inductor coupled between the output voltage node and the phase node; a zero-crossing detection circuit configured to detect, in response to a PFM activation signal, whether a voltage of the phase node crosses a voltage zero point to generate a zero-crossing detection signal; and a control logic configured to generate, in response to the turn-on clock signal and the zero-crossing detection signal, the switching signals. The method further includes: configuring a PFM/PWM logic control circuit to respectively output, in response to a PFM control signal and a control signal associated with the switching signals, at least one first PFM control signal and at least one second PFM control signal to at least one first phase circuit and at least one second phase circuit of the plurality of phase circuits; configuring the PFM/PWM logic control circuit enters the first phase, the second phase, and the third phase under light load or no load conditions. In the first phase, the at least one first phase circuit operates in a PFM mode, and the at least one second phase circuit alternatively operates in the PFM mode and a PWM mode. In the second phase, the at least one first phase circuit operates in the PFM mode, and the at least one second phase circuit operates in the PWM mode. In the third phase, the at least one first phase circuit operates in the PWM mode, and the at least one second phase circuit operates in the PWM mode.

One of the advantages of the present disclosure is that the multi-phase DC-DC power converter and the driving method thereof provided by the present disclosure can greatly reduce the voltage drop generated under the light load or no load conditions by switching the timing of the PWM mode/PFM mode by controlling the phase circuit in three-phases.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
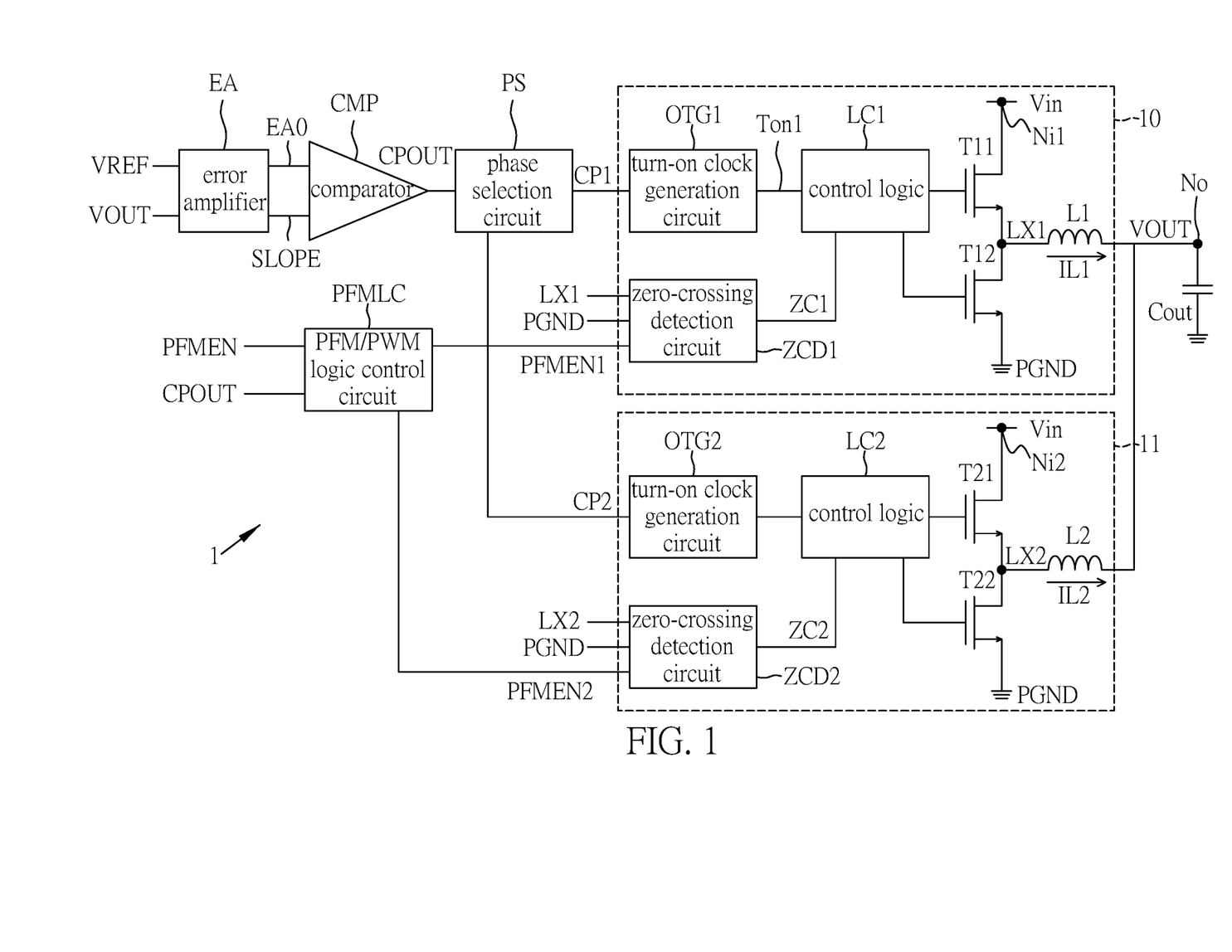
FIG. 1 is a circuit diagram of a multi-phase DC-DC power converter according to an embodiment of the present disclosure.

FIG. 1 is a circuit diagram of a multi-phase DC-DC power converter according to an embodiment of the present disclosure. The embodiment of the present disclosure provides a multi-phase DC-DC power converter 1, which includes an error amplifier EA, a comparator CMP, a phase selection circuit PS, a plurality of phase circuits, and a PFM/PWM logic control circuit PFMLC.

The error amplifier EA receives a reference voltage VREF and a feedback voltage from an output voltage node No, that is, an output voltage VOUT, and amplifies a difference signal between the output voltage VOUT and the reference voltage VREF to output an error signal EA0.

The comparator CMP receives and compares the error signal EA0 with the sawtooth signal SLOPE to generate a comparison output signal CPOUT. For example, when a potential of the error signal EA0 is greater than that of the sawtooth signal SLOPE, a voltage with high potential is output, for example 1, and when the potential of the error signal EA0 is smaller than that of the sawtooth signal SLOPE, a voltage with low potential is output, for example 0, and thus a clock signal can be generated and can be used as a PWM control signal.

The phase selection circuit PS is configured to separate the comparison output signal CPOUT into a plurality of phase signals, such as a first phase signal CP1 and a second phase signal CP2. In the multi-phase power converter, input and output ripple currents and hot spots on printed circuit boards or specific components can be reduced since the phases are interleaved. In fact, the multi-phase power converter can reduce current consumptions of switching transistors and inductors by half, and the interleaved phases can also reduce conduction losses.

The plurality of phase circuits, such as a first phase circuit 10 and a second phase circuit 11, are each associated with one phase of the multi-phase DC-DC power converter 1. In the present embodiment, the multi-phase DC-DC power converter 1 is a two-phase DC-DC power converter and thus has two phase circuits. The first phase circuit 10 includes a turn-on clock generation circuit OTG1, a first switch transistor T11, a second switch transistor T12, an output inductor L1, a zero-crossing detection circuit ZCD1, and a control logic LC1.

The turn-on clock generation circuit OTG1 is configured to generate a turn-on clock signal Ton1 in response to the first phase signal CP1. The first switching transistor T11 is connected between an input voltage node Ni and a phase node LX1, and determines an on-state condition thereof in response to a switching signal from the control logic LC1. The second switching transistor T12 is connected between the phase node LX1 and a ground node PGND, and similarly determines an on-state condition in response to another switching signal from the control logic LC1. The output inductor L1 is connected between the output voltage node No and the phase node LX1.

The zero-crossing detection circuit ZCD1 is configured to detect, in response to a PFM activation signal PFMEN, whether a current of the phase node LX1 crosses a current zero point to generate a zero-crossing detection signal ZC1. In detail, the zero-crossing detection circuit ZCD1 monitors a voltage of the phase node LX1 and compares it with a voltage of the ground node PGND to confirm whether the current zero point is crossed, and the generated zero-crossing detection signal ZC1 can be used to allow the phase circuits to enter a PFM mode.

The control logic LC1 is configured to generate, in response to the turn-on clock signal Ton1 and the zero-crossing detection signal ZC1, the switching signals to determine the on-state conductions of the first switching transistor T11 and the second switching transistor T12. In other words, the first switching transistor T11 and the second switching transistor T12 are connected in series between an input voltage Vin and a ground voltage. The first switching transistor T11 and the second switching transistor T12 are selectable to be turned on and off to generate a switching output voltage at the phase node LX1. The switching output voltage is directly coupled to the LC filter circuit. The LC filter circuit includes an output inductor L1 and an output capacitor Cout, which produces an output voltage VOUT at the output voltage node No having a substantially constant amplitude. A load can then be driven with the output voltage VOUT.

On the other hand, the second phase circuit 11 includes a turn-on clock generation circuit OTG2, a first switch transistor 211, a second switch transistor T22, an output inductor L2, a zero-crossing detection circuit ZCD2, and a control logic LC2. A configuration of the second phase circuit 11 is basically similar to that of the components of the first phase circuit 10, and thus the repeated description is omitted. The turn-on clock generation circuit OTG2 correspondingly generates, in response to a second phase signal CP2, a turn-on clock signal Ton2. The first switching transistor T12 is connected between an input voltage node Ni2 and the phase node LX2, and the second switching transistor T22 is connected between the phase node LX2 and the ground node PGND. The first switching transistor T12 and the second switching transistor T22 determine their on-state conditions in response to a plurality of switching signals from the control logic LC2.

Similarly, the output inductor L2 is connected between the output voltage node No and the phase node LX2, and the zero-crossing detection circuit ZCD2 is configured to detect, in response to the PFM turn-on signal PFMEN, whether a current of the phase node LX2 crosses the current zero point to generate a zero-crossing detection signal ZC2. In detail, the zero-crossing detection circuit ZCD2 monitors a voltage of the phase node LX2 and compares it with the voltage of the ground node PGND to confirm whether the current zero point is crossed, and the generated zero-crossing detection signal ZC2 can be used to allow the phase circuits to enter the PFM mode.

The multi-phase DC-DC power converter 1 further includes the PFM/PWM logic control circuit, which is configured to output, in response to the PFM control signal PFMEN and a control signal associated with switching signals, for example, a comparison output signal CPOUT, a first PFM control signal PFMEN1 and a second PFM control signal PFMEN2 to the first phase circuit 10 and the second phase circuit 11. For example, the plurality of phase circuits can be divided into a plurality of first phase circuits 10 and a plurality of second phase circuits 11, and the plurality of first phase circuits 10 and the plurality of second phase circuits 11 can be controlled by a plurality of first PFM control signals PFMEN1 and a plurality of second PFM control signals PFMEN2, respectively, to be operated in the PFM mode or a PWM mode. Further, any one of signals with information of a comparison output signal CPOUT can be used as a trigger signal, such as the first PFM control signal PFMEN1 and the second PFM control signal PFMEN2, and is not limited to the above embodiment.

In this case, the PFM/PWM logic control circuit PFMLC has three-phase controlling mechanism under a light load condition or a no load condition, when, for example, the output voltage node No is not connected to a load or is connected to a small load. In detail, reference is now made to FIG. 2 and FIG. 3, which show a timing diagram of signals in a first phase during an operation of a PFM/PWM logic control circuit according to an embodiment of the present disclosure and a timing diagram of signals in the first phase to a third phase during an operation of the PFM/PWM logic control circuit according to an embodiment of the present disclosure. As shown, the PFM/PWM logic control circuit PFMLC will enter a first phase T1, a second phase T2, and a third phase T3.

Figure 2:
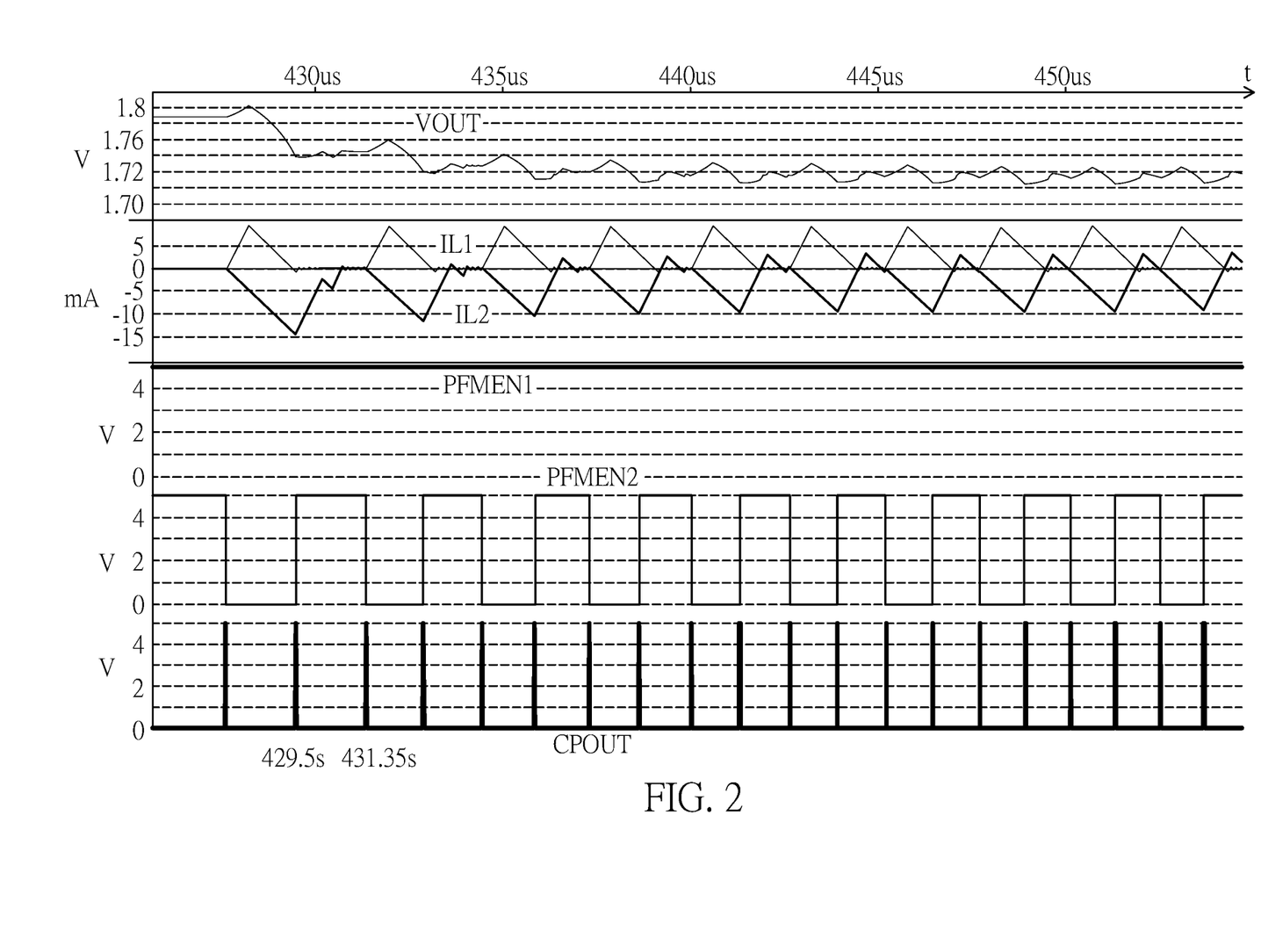
FIG. 2 is a timing diagram of signals in a first phase during an operation of a PFM/PWM logic control circuit according to an embodiment of the present disclosure.
Figure 3:
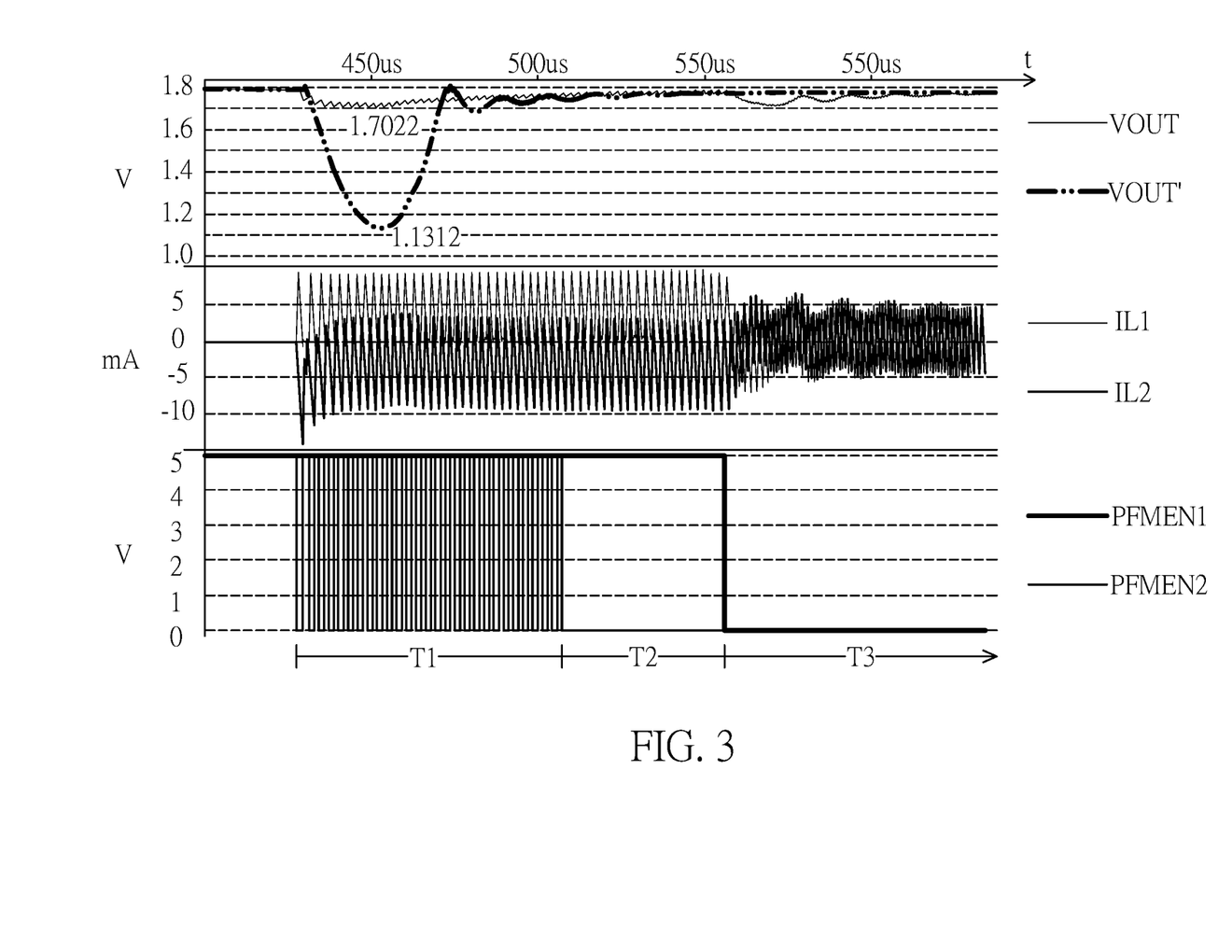
FIG. 3 is a timing diagram of signals in the first phase to a third phase during an operation of the PFM/PWM logic control circuit according to an embodiment of the present disclosure.

In the first phase T1, the first phase circuit 10 operates in the PFM mode, and the second phase circuit 11 alternatively operates in the PFM mode and the PWM mode. In the second phase T2, the first phase circuit 10 operates in the PFM mode and the second phase circuit 11 operates in the PWM mode. In the third phase T3, the first phase circuit 10 operates in the PWM mode, and the second phase circuit 11 operates in the PWM mode.

When the output voltage node No is not connected to the load, the first phase T1 is entered first. The PFM activation signal PFMEN is input to the PFM/PWM logic control circuit PFMLC with a low potential, and the PFM/PWM logic control circuit PFMLC generates the first PFM control signal PFMEN1 with a high potential, and generates the second PFM control signal PFMEN2 with interleaved high and low potentials by using the comparison output signal CPOUT. In other words, when a first high potential signal appears on the comparison output signal CPOUT, the first phase circuit 10 enters the PFM mode at this time, and the second PFM control signal PFMEN2 with low potential causes the second phase circuit 11 to enter the PWM mode first, and a leakage current flows from the second phase circuit 11 until a second high potential signal appears on the comparison output signal CPOUT, and the second PFM control signal PFMEN2 with high potential is generated in response to the comparison output signal CPOUT and forcibly activates the zero-crossing detection circuit ZCD2 to perform a zero-crossing detection, such that the second phase circuit 11 enters the PFM mode, and the inductor current IL2 is reset to zero.

Therefore, the second phase circuit 11 alternatively enters the PWM mode and the PFM mode maintains the inductor current IL2 at a small negative inductor current. At this time, the first phase circuit 10 enters the PFM mode, such that the output voltage VOUT generates a voltage drop. However, since the second phase circuit 11 alternatively enters the PWM mode and the PFM mode, the inductor current IL2 can be maintained at the small negative inductor current, thereby effectively suppressing a drop level of the output voltage VOUT. As shown in FIG. 3, by using the multi-phase DC-DC power converter of the present disclosure, when the output voltage VOUT, compared with an output voltage VOUT' of the existing multi-phase DC-DC power converter under the same circuit condition, enters the PWM mode from the PFM mode under the no load condition, a difference between the drop levels is about |1.1312−1.7022|=0.571V. Accordingly, it can be seen that the drop level of the output voltage VOUT is effectively suppressed.

After a first predetermined period of time expires after a starting point of the first phase T1, the inductor currents IL1 and IL2 will be stabilized, and the second phase T2 is entered. The PFM/PWM logic control circuit PFMLC generates the second PFM control signal PFMEN2 with low potential, such that the second phase circuit 11 enters the PWM mode, and the first phase circuit 10 is maintained in the PFM mode. At this time, the output voltage VOUT is gradually returned to be stabilized from the previous generated voltage drop. After a second predetermined period of time expires after the starting point of the first phase T1, the third phase T3 is entered.

In the third phase T3, the PFM/PWM logic control circuit PFMLC generates the first PFM control signal PFMEN1 with low potential, such that the first phase circuit 10 enters the PWM mode, and the inductor currents IL1 and IL2 are again merged to generate a voltage drop in the output voltage VOUT. However, the drop level of the voltage drop will be lower than the drop level caused by the previous voltage drop. At this phase, both the first phase circuit 10 and the second phase circuit 11 enter the PWM mode, and the output voltage VOUT will also be gradually stabilized from the previous generated voltage drop.

Figure 4:
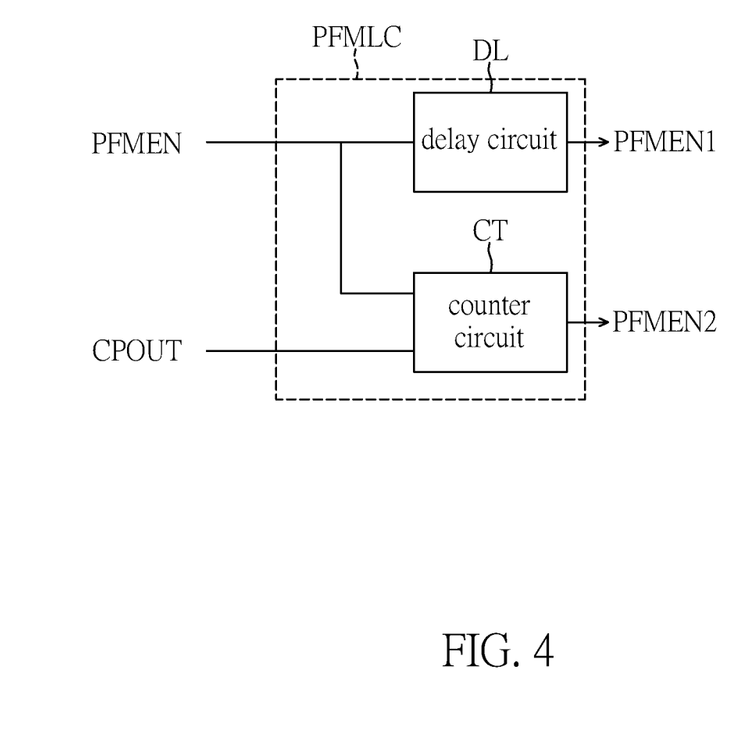
FIG. 4 is a circuit diagram of the PFM/PWM logic control circuit in accordance with an embodiment of the present disclosure.

Reference is made to FIG. 4, which is a circuit diagram of the PFM/PWM logic control circuit in accordance with an embodiment of the present disclosure. As shown, in order to achieve the above control mechanism, the PFM/PWM logic control circuit PFMLC includes a delay circuit DL and a counter circuit CT. The delay circuit DL delays, in response to the PFM control signal PFMEN, the PFM control signal PFMEN by the second predetermined time to generate the first PFM control signal PFMEN1. As described above, the first PFM control signal PFMEN1 has high potential in both of the first stage T1 and the second stage T2, and after the third stage T3 is entered, after the second predetermined period of time expires after the starting point of the first stage T1, the first PFM control signal PFMEN1 is turned to the low level. The second predetermined period of time needs to be designed by simulating an operation of the circuit to determine a time point at which the output voltage VOUT returns to a stable state.

On the other hand, the PFM/PWM logic control circuit PFMLC further includes the counter circuit CT that generates the second PFM control signal PFMEN2 in response to the PFM control signal PFMEN and a control signal associated with the switching signals. The control signal associated with the switching signals may include at least one of the comparison output signal CPOUT, the error signal EA0, the first phase signal CP1, and the second phase signal CP2. In this embodiment, the comparison output signal CPOUT is used as the control signal. Here, as described above, in the first phase T1, the second PFM control signal PFMEN2 is required to generate an interleaved high and low potential signal, such that the second phase circuit 11 alternatively operates in the PWM mode and the PFM mode, and after entering the second phase T2, the second PFM control signal PFMEN2 is turned to the low potential to maintain the second phase circuit 11 to be in the PWM mode.

In this case, the first predetermined period of time needs to be designed by simulating an operation of the circuit to determine a time point at which the inductor currents IL1 and IL2 of the first phase circuit 10 and the second phase circuit 11 return to the stable state, and the second predetermined period of time has to be larger than the first predetermined period of time. Therefore, an example for generating the second PFM control signal PFMEN2 is provided below.

Figure 5:
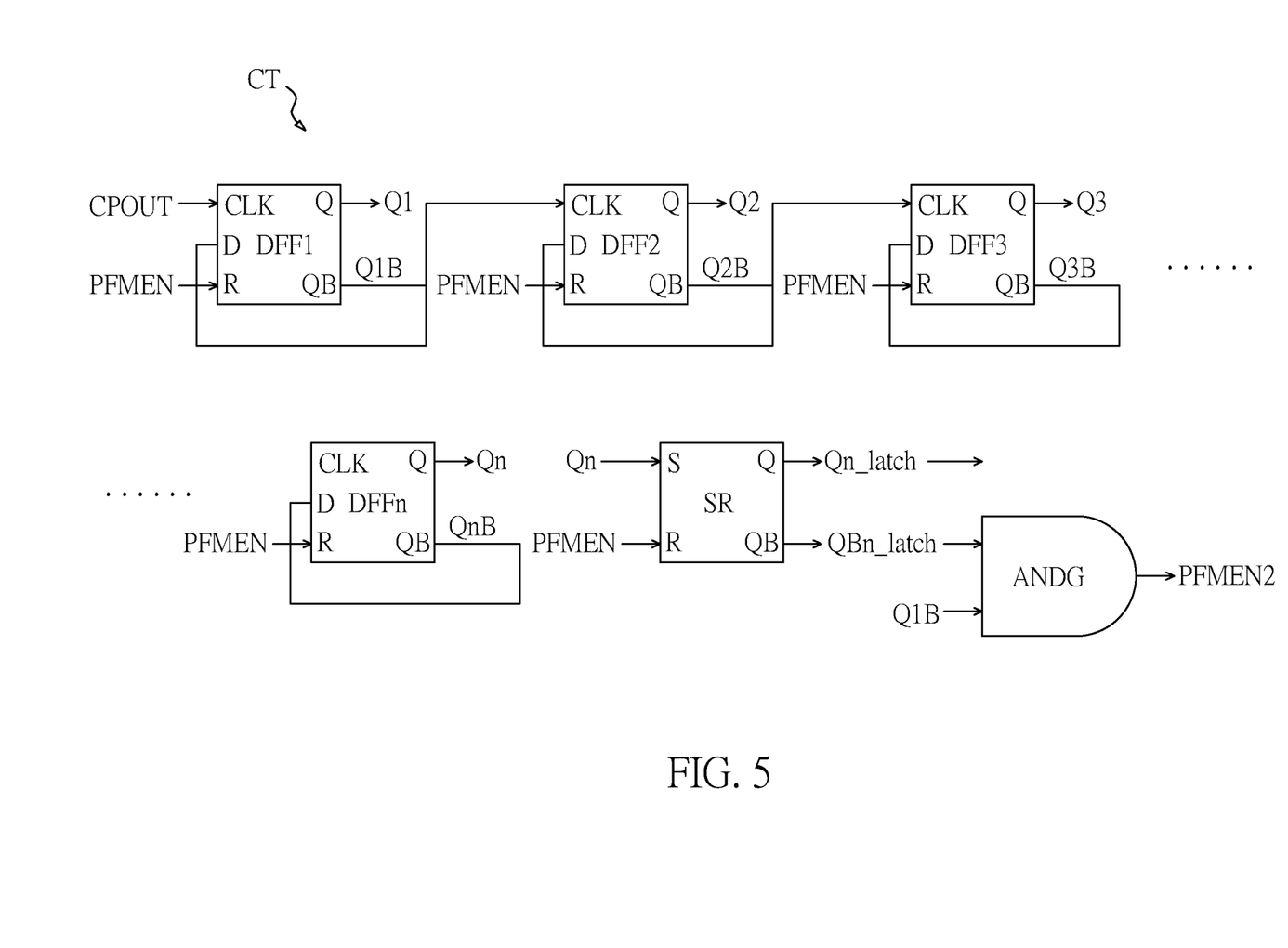
FIG. 5 is a circuit diagram of a counter circuit according to an embodiment of the present disclosure.

Reference is made to FIG. 5, which is a circuit diagram of a counter circuit according to an embodiment of the present disclosure. As shown, the counter circuit CT can include a plurality of D-type flip-flops DFF1, DFF2, . . . , DFFn, an SR latch SR, and an AND gate ANDG. A number of D-type flip-flops DFF1, DFF2, . . . , DFFn can be used to determine the second predetermined period of time. In this case, a clock terminal CLK of the D-type flip-flop DFF1 receives the comparison output signal CPOUT, a reset terminal R receives the PFM control signal PFMEN, a first output terminal Q generates an output signal Q1, a input terminal D is coupled to a second output terminal QB, and outputs an inverted signal Q1B to a clock terminal CLK of the D-type flip-flop DFF2. Similarly, the plurality of D-type flip-flops DFF2, DFFn also generate output signals Q2, Q3, . . . , Qn at first output terminals Q, and generate inverted signals Q2B, Q3B, . . . , QnB at second output terminals QB.

Here, one of the output signals Q1, Q2, . . . , Qn may be selected, according to the selected first predetermined time, to input to a setup terminal S of the SR latch SR, the PFM control signal PFMEN is input to a reset terminal R of the SR latch SR, a first latching signal Qn_latch and a second latching signal QBn_latch are output from the first output terminal Q and the second output terminal QB, respectively. Since the PFM control signal PFMEN is always low, when the selected output signal, for example, the output signal Qn is high, the second latch signal QBn_latch will be low, and when the output signal Qn is low, the feedback will cause the second latch signal QBn_latch to be maintained at a low potential.

In addition, the counter circuit CT further includes the AND gate ANDG, which respectively receives the second latch signal QBn_latch and the inverted signal Q1B, and correspondingly generates a second PFM control signal PFMEN2.

Figure 6:
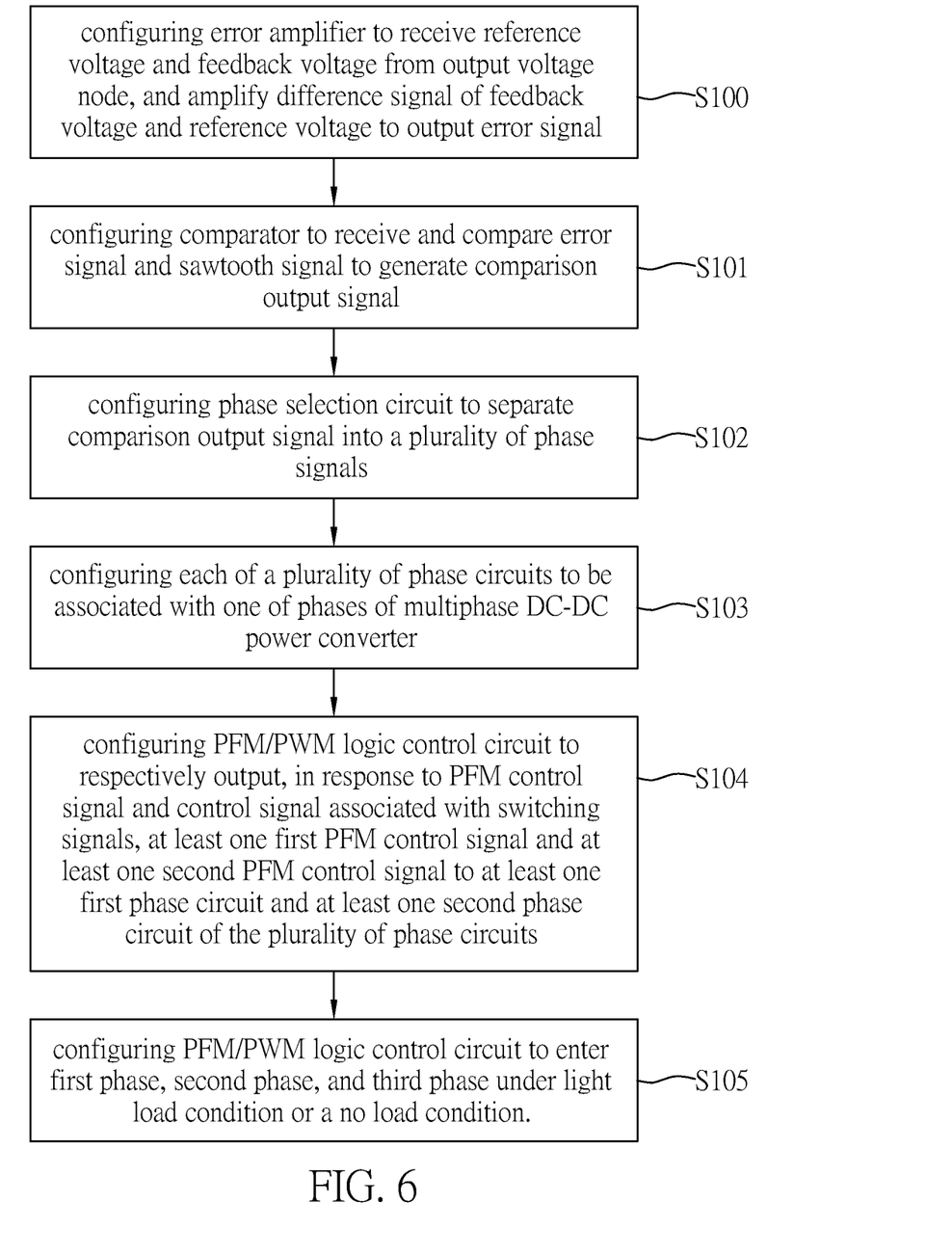
FIG. 6 is a flowchart of a driving method of a multi-phase DC-DC power converter according to an embodiment of the present disclosure.

Referring to FIG. 6, another embodiment of the present disclosure provides a driving method of a multi-phase DC-DC power converter. In the present embodiment, the driving method is applied to the embodiments shown in FIGS. 1 to 5, but is not limited thereto. The driving method of the multi-phase DC-DC power converter includes at least the following steps:

Step S100: configuring an error amplifier to receive a reference voltage and a feedback voltage from an output voltage node, and amplify a difference signal of the feedback voltage and the reference voltage to output an error signal.

Step S101: configuring a comparator to receive and compare the error signal and a sawtooth signal to generate a comparison output signal;

Step S102: configuring a phase selection circuit to separate the comparison output signal into a plurality of phase signals;

Step S103: configuring each of a plurality of phase circuits to be associated with one of phases of the multiphase DC-DC power converter. Here, the plurality of phase circuits each includes a turn-on clock generation circuit, a first switch transistor, a second switch transistor, an output inductor, a zero-crossing detection circuit, and a control logic. The above components have been described in the above embodiments, and thus the repeated description is omitted.

Step S104: configuring a PFM/PWM logic control circuit to respectively output, in response to a PFM control signal and a control signal associated with the switching signals, at least one first PFM control signal and at least one second PFM control signal to at least one first phase circuit and at least one second phase circuit of the plurality of phase circuits; and Step S105: configuring the PFM/PWM logic control circuit to enter a first phase, a second phase, and a third phase under a light load condition or a no load condition.

Here, in the first phase, the first phase circuit operates in the PFM mode, and the second phase circuit alternatively operates in the PFM mode and the PWM mode. In the second phase, the first phase circuit operates in the PFM mode and the second phase circuit operates in the PWM mode. In the third phase, the first phase circuit operates in the PWM mode, and the second phase circuit operates in the PWM mode.

One of the advantages of the present disclosure is that the multi-phase DC-DC power converter and the driving method thereof provided by the present disclosure can greatly reduce the voltage drop generated under the light load or no load conditions by switching the timing of the PWM mode/PFM mode by controlling the phase circuit in three-phases.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated.

Alternative embodiments will become apparent to those skilled in the art to which the present disclosure pertains without departing from its spirit and scope.

What is claimed is:

1. A multi-phase DC-DC power converter, comprising:
   an error amplifier configured to receive a reference voltage and a feedback voltage from an output voltage node, and amplify a difference signal of the feedback voltage and the reference voltage to output an error signal;
   a comparator configured to receive and compare the error signal and a sawtooth signal to generate a comparison output signal;
   a phase selection circuit configured to separate the comparison output signal into a plurality of phase signals;
   a plurality of phase circuits each associated with one of phases of the multiphase DC-DC power converter, each including:
      a turn-on clock generation circuit configured to generate a turn-on clock signal in response to one of the plurality of phase signals;
      a first switching transistor responsive to a switching signal and coupled between an input voltage node and a phase node;
      a second switching transistor responsive to another switching signal and coupled between the phase node and a ground node;
      an output inductor coupled between the output voltage node and the phase node;
      a zero-crossing detection circuit configured to detect, in response to a PFM activation signal, whether a voltage of the phase node crosses a voltage zero point to generate a zero-crossing detection signal; and
      a control logic configured to generate, in response to the turn-on clock signal and the zero-crossing detection signal, the switching signals; and
   a PFM/PWM logic control circuit configured to respectively output, in response to a PFM control signal and a control signal associated with the switching signals, at least one first PFM control signal and at least one second PFM control signal to at least one first phase circuit and at least one second phase circuit of the plurality of phase circuits,
   wherein the PFM/PWM logic control circuit enters a first phase, a second phase, and a third phase under a light load condition or a no load condition, wherein in the first phase, the at least one first phase circuit operates in a PFM mode, and the at least one second phase circuit alternatively operates in the PFM mode and a PWM mode,
   wherein in the second phase, the at least one first phase circuit operates in the PFM mode, and the at least one second phase circuit operates in the PWM mode,
   wherein in the third phase, the at least one first phase circuit operates in the PWM mode, and the at least one second phase circuit operates in the PWM mode.

2. The multi-phase DC-DC power converter according to claim 1, wherein the second phase is entered after a first predetermined period of time expires after a starting point of the first phase, and the first predetermined time is determined based on inductor currents of the at least one first phase circuit and the at least one second phase circuit.

3. The multi-phase DC-DC power converter according to claim 2, wherein the second phase is entered after a second predetermined period of time expires after the starting point of the first phase, and the second predetermined period of time is determined based on a voltage of the output voltage node.

4. The multi-phase DC-DC power converter according to claim 3, wherein the PFM/PWM logic control circuit includes:
   a delay circuit configured to delay, in response to the PFM control signal, the PFM control signal by the first predetermined period of time to generate the at least one first PFM control signal; and a counter circuit configured to generate, in response to the PFM control signal and the control signal associated with the switching signals, the at least one second PFM control signal.

5. The multiphase DC-DC power converter of claim 4, wherein the counter circuit includes a plurality of D-type flip-flops, an SR latch, and an AND gate.

6. The multi-phase DC-DC power converter according to claim 5, wherein a number of the plurality of D-type flip-flops is used to determine the second predetermined period of time.

7. The multi-phase DC-DC power converter according to claim 1, wherein the control signal associated with the switching signals includes at least one of the comparison output signal, the error signal, the first phase signal, and the second phase signal.

8. The multi-phase DC-DC power converter according to claim 1, wherein in the first phase, the at least one second phase circuit first enters the PWM mode and then enters the PFM mode.

9. A driving method of a multi-phase DC-DC power converter, comprising:
    configuring an error amplifier to receive a reference voltage and a feedback voltage from an output voltage node, and amplifying a difference signal of the feedback signal and the reference voltage to output an error signal;
    configuring a comparator to receive and compare the error signal and a sawtooth signal to generate a comparison output signal;
    configuring a phase selection circuit to separate the comparison output signal into a plurality of phase signals;
    configuring each of a plurality of phase circuits to be associated with one of phases of the multiphase DC-DC power converter, wherein the plurality of phase circuits each includes:
        a turn-on clock generation circuit configured to generate a turn-on clock signal in response to one of the plurality of phase signals;
        a first switching transistor responsive to a switching signal and coupled between an input voltage node and a phase node;
        a second switching transistor responsive to another switching signal and coupled between the phase node and a ground node;
        an output inductor coupled between the output voltage node and the phase node;
        a zero-crossing detection circuit configured to detect, in response to a PFM activation signal, whether a voltage of the phase node crosses a voltage zero point to generate a zero-crossing detection signal; and
        a control logic configured to generate, in response to the turn-on clock signal and the zero-crossing detection signal, the switching signals;
    configuring a PFM/PWM logic control circuit to respectively output, in response to a PFM control signal and a control signal associated with the switching signals, at least one first PFM control signal and at least one second PFM control signal to at least one first phase circuit and at least one second phase circuit of the plurality of phase circuits; and
    configuring the PFM/PWM logic control circuit to enter the first phase, the second phase, and the third phase under light load or no load conditions,
    wherein in the first phase, the at least one first phase circuit operates in a PFM mode, and the at least one second phase circuit alternatively operates in the PFM mode and a PWM mode,
    wherein in the second phase, the at least one first phase circuit operates in the PFM mode, and the at least one second phase circuit operates in the PWM mode,
    wherein in the third phase, the at least one first phase circuit operates in the PWM mode, and the at least one second phase circuit operates in the PWM mode.

* * * * *